United States Patent [19]

Mullins

[11] Patent Number: 4,549,820
[45] Date of Patent: Oct. 29, 1985

[54] OPPOSED BUTTON THRUST SURFACES FOR EARTH BORING BITS

[75] Inventor: John M. Mullins, Houston, Tex.

[73] Assignee: Hughes Tool Company - USA, Houston, Tex.

[21] Appl. No.: 578,318

[22] Filed: Feb. 13, 1984

Related U.S. Application Data

[63] Continuation of Ser. No. 389,781, Jun. 18, 1982, abandoned.

[51] Int. Cl.⁴ ............................................. F16C 17/04
[52] U.S. Cl. .................................................... 384/95
[58] Field of Search ................... 384/92, 95, 303, 282, 384/284, 285, 420; 175/371; 308/DIG. 8

[56] References Cited

U.S. PATENT DOCUMENTS 2,086,681 7/1937 Scott ..................................... 384/95

Primary Examiner—Stuart S. Levy
Assistant Examiner—David Werner
Attorney, Agent, or Firm—Robert A. Felsman; James E. Bradley

[57] ABSTRACT

An earth boring bit has thrust surfaces with enhanced cooling features. The bit has a body with three depending bearing pins. A cutter having an axial cavity is mounted on each bearing pin. The bearing pin and the cavity have mating thrust shoulders. Hard metal inserts or buttons are spaced around each of the shoulders and secured interferingly in mating holes. The buttons in one of the shoulders protrude slightly from the shoulder to allow air to flow past.

2 Claims, 3 Drawing Figures

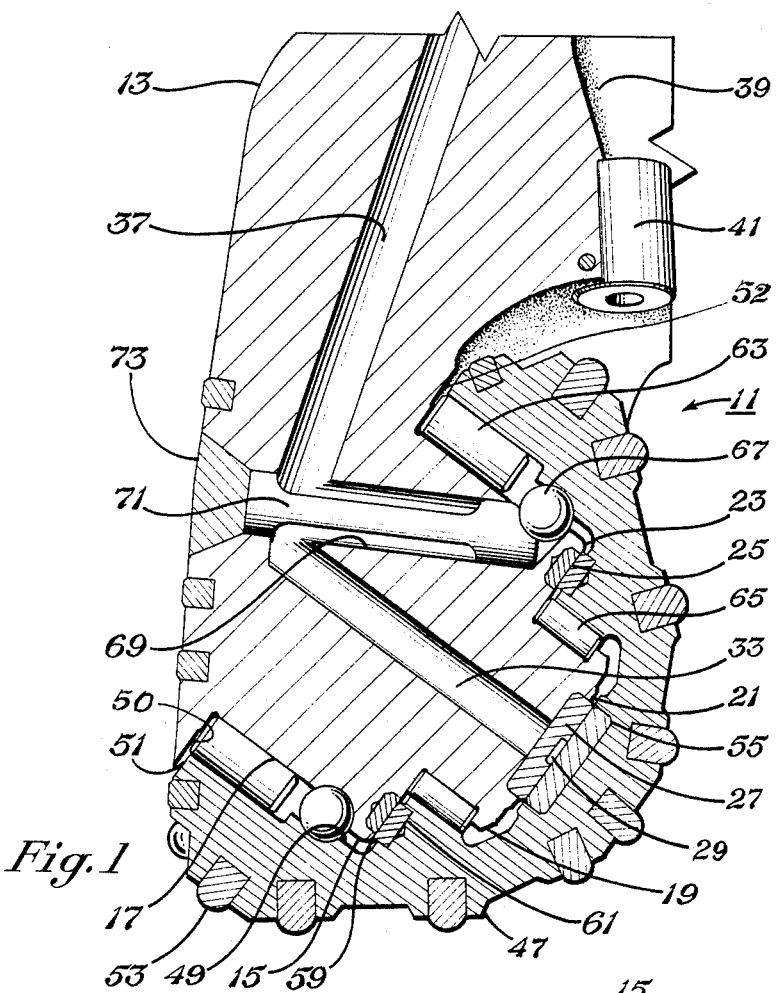
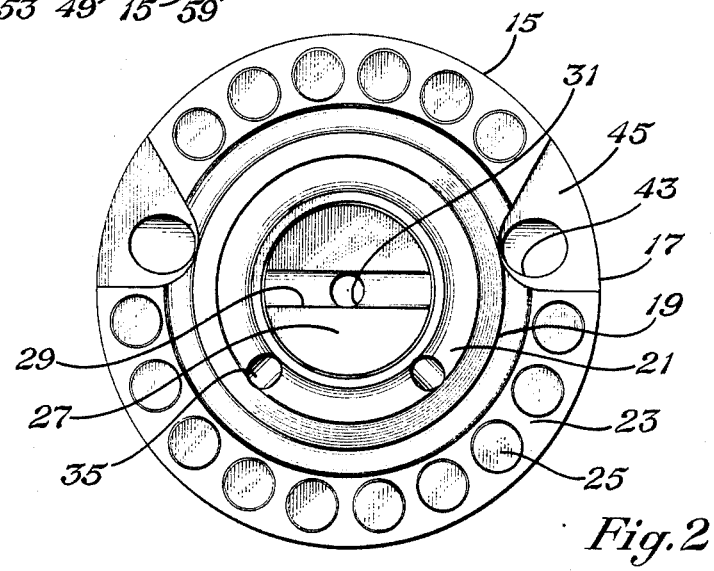

OPPOSED BUTTON THRUST SURFACES FOR EARTH BORING BITS

This application is a continuation of application Ser. No. 389,781, filed 06/18/82 now abandoned.

BACKGROUND OF THE INVENTION

This invention relates in general to earth boring bits, and in particular to surfaces in a bit for absorbing outward thrust of the cutter on the bearing pin.

Conventional earth boring bits have a body with three depending bearing pins, each of which receives a rotatable conical cutter. Journal or roller bearings between the cutter and bearing pin absorb large forces imposed on the bit during drilling. Normal downward drilling also causes the cutter to exert an outward force on the bearing pin, tending to push the cutter farther onto the bearing pin. This outward thrust is handled by one or more thrust surfaces located between the cutter and bearing pin in a plane perpendicular to the axis of the bearing pin. Usually these thrust surfaces have inlays of hard metal to reduce the wear on the thrust surfaces.

One type of bit is particularly used in the mining industry for drilling blast holes of relatively short depth. Compressed air is pumped through the drill bit for cooling the bit and blowing cuttings to the surface. Some of the air is diverted through the bearing areas for cooling the bearings. One of the thrust surfaces comprises opposed shoulders on the bearing pin and in the cutter. If these thrust shoulders wear sufficiently, the backface of the cutter will contact the last machined surface of the bit leg, resulting in locking and destruction of the bit. Improving the wear resistance of the shoulders is a long standing problem.

CROSS-REFERENCE TO RELATED APPLICATION

This application is being filed concurrently with an application entitled "SPACED BUTTON THRUST SURFACE FOR EARTH BORING BIT" U.S. Pat. No. 4,451,162, issued May 29, 1984, inventor William Leroy Shepherd.

SUMMARY OF THE INVENTION

In this invention, each of the thrust shoulders contains a plurality of wear resistant buttons. These buttons engage each other in sliding contact to absorb outward thrust. The buttons are secured in holes with an interference fit. The buttons in at least one of the shoulders protrude a short distance from the shoulder to enhance cooling. In the preferred embodiment, the buttons in one shoulder are tungsten carbide, while the buttons in the opposite shoulder are of tool steel.

BRIEF DESCRIPTION OF THE DRAWINGS

FIG. 1 is a vertical sectional view of a portion of an earth boring bit constructed in accordance with this invention.

FIG. 2 is an end view of the bearing pin of the bit of FIG. 1, shown with the cutter removed.

DESCRIPTION OF THE PREFERRED EMBODIMENT

Figure 3:
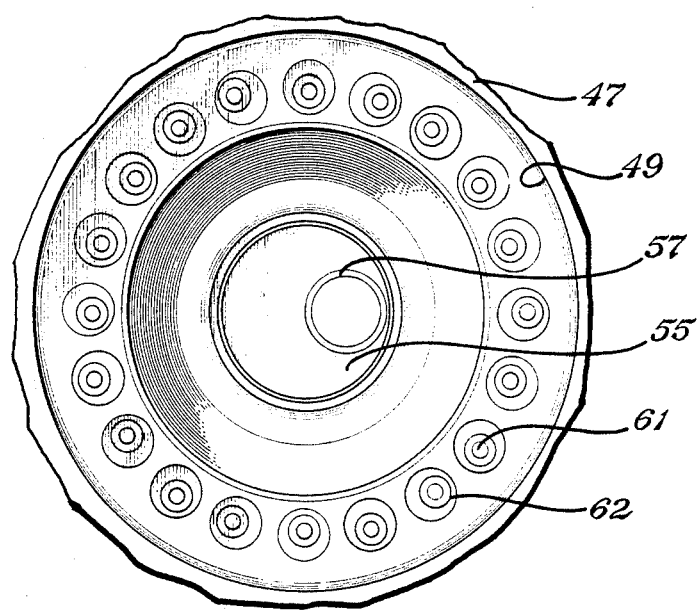
FIG. 3 is an end view looking inward into the cavity of the cutter of FIG. 1, with the bearing pin not shown.

Referring to FIG. 1, earth boring bit 11 has a body that includes three head sections 13 (only one shown). Each head section 13 has a depending bearing pin 15 integrally formed with it. Bearing pin 15 is a generally cylindrical member, having a cylindrical outer section 17 that joins head section 13. An inner section 19 of smaller diameter than the outer section 17, is formed on the free end of bearing pin 15. The extreme end 21 of bearing pin 15 is a flat surface perpendicular to the axis of bearing pin 15. An annular shoulder 23 is defined by the junction of the inner section 19 and the outer section 17. Shoulder 23 is located in a plane parallel with the plane containing the bearing pin end 21.

A plurality of spaced-apart inserts or buttons 25 are located in the shoulder 23. Each button 25 is a cylindrical member of hard, wear resistant material, preferably sintered tungsten carbide. The cylindrical wall surface (not shown) of each button 25 is preferably fluted or serrated. Each button 25 is interferingly pressed into a cylindrical hole drilled in the supporting metal of shoulder 23. The serrated exterior helps retain the button 25 within the hole. The supporting metal of shoulder 23 will be of considerably less hardness than the buttons 25. In the preferred embodiment, the depth of the hole for each button 25 is the same as the length of the button, resulting in the outer end of each button being flush with the surface of shoulder 23. The outer end of each button 25 is flat and located in the same plane that contains the shoulder 23. As shown in FIG. 2, buttons 25 are in a circular array, with each button 25 spaced from adjacent buttons 25 a distance that is equal to about one half the diameter of the buttons.

Referring again to FIG. 1, a disk or button 27 of considerably larger diameter than buttons 25 is located in the bearing pin end 21. Button 27 is also formed of a hard metal, preferably tungsten carbide. The face of button 27 contains a groove or channel 29 that extends across the face and intersects the perimeter of button 27. Button 27 protrudes from bearing pin 21 a short distance. An axial hole 31 extends through button 27 and intersects channel 29.

A passage 33 extends axially through bearing pin 15, with its outlet registering with hole 31. Two passages 35 (FIG. 2) intersect bearing pin end 21 radially outward of button 27. Passage 33 and passages 35 are in communication with a passage 37 that extends to an axial passage (not shown) that is located on the axis of the bit. This axial passage has three outlets 39, each containing a nozzle 41 for discharging drilling fluid. Other circulation passages include two passages 43 (FIG. 2), which extend from passage 37 to shoulder 23. The exit of each passage 43 is located in a recessed area 45, where a shallow portion of shoulder 23 has been removed. Recesses 45 enable drilling fluid to circulate past the shoulder 23. As shown in FIG. 2, no buttons 25 are located within the recessed areas 45.

Each bearing pin 15 is adapted to receive a rotatable, generally conical cutter 47. Cutter 47 has a cavity 49 that fits over and is carried by bearing pin 15. Cavity 49 is axial, and is surrounded at its entrance by a backface 51. Backface 51 is spaced a selected distance away from the last machined surface 50 located on the inside surface of the head section 13. Backface 51 does not slidingly engage the last machined surface 50 until the bit thrust surfaces have failed after extensive use. An air exit slot 52 is located on the inside surface of head section 13 on the upper side of bearing pin 15. Cutter 47 is of a conventional type having inserts or cutting elements 53 for disintegrating the earth formation, preferably formed of tungsten carbide.

A single, large disk or button 55 is located in the bottom of cavity 49 on the axis of cavity 49. Button 55 has a diameter equal to button 27. Button 55 is secured in a hole in cutter 47 with its outer surface flush with the bottom of cavity 49 in the preferred embodiment. Button 55 has a flat outer surface containing an inlay 57, as shown in FIG. 3. Inlay 57 is a circular groove offset from the axis of button 55 and filled with a solid lubricant such as silver. Button 55 is formed of a hard, wear resistant material, preferably a tool steel alloy.

Referring again to FIG. 1, cavity 49 has a small diameter and a large diameter portion, divided by a shoulder 59. Shoulder 59 is positioned opposite bearing pin shoulder 23 and spaced a short distance away. A plurality of buttons 61 in a circular array are interferingly pressed into holes formed in shoulder 59. Buttons 61 are of a hard, wear resistant material, preferably tool steel alloy. Buttons 61 have a knurled cylindrical surface for assisting in retaining the buttons within the mating holes. Buttons 61 have a length that is greater than the depth of the holes in shoulder 59, resulting in the buttons 61 protruding a short distance from shoulder 59. The outer ends of buttons 61 are flat and co-planar for slidingly engaging the outer ends of buttons 25. As shown in FIG. 3, each outer end contains an inlay 62 of a silver alloy. The alloy of inlay 62 is placed in a shallow, circular groove formed eccentric to the axis of each button 61. The buttons 61 are inserted randomly so that the inlays 62 are oriented in different ways. Inlay 62 provides lubrication.

The bit shown in FIG. 1 has bearing means that includes a set of roller bearings 63 mounted near the entrance to cavity 49. Roller bearings 63 are cylindrical bearings that engage the bearing pin outer section 17 in rolling contact. Roller bearings 63 are not intended to absorb axial or outward thrust. The bearing means also includes a set of roller bearings 65 of smaller diameter than roller bearings 63. Bearings 65 are cylindrical and positioned in a race in the inner section 19 of bearing pin 15. Bearings 65 also engage in rolling contact the cavity 39 and the bearing pin 15.

Cutter 47 is retained on bearing pin 15 by means of a plurality of balls 67. Balls 67 lock the cutter 47 to the bearing pin 15 after the cutter has been inserted over the bearing pin 15. Balls 67 are placed within mating races by means of a passage 69. A retainer 71 holds the balls 67 in place. Retainer 71 is secured by a plug weld 73. Passage 69 is in communication with passage 37 for receiving air being pumped through bit 11.

In operation, the bit 11 will be lowered into the hole and rotated, causing each cutter 47 to rotate about the axis of each bearing pin 15. The antifriction bearings comprising rollers 63 and 65 absorb downward drilling forces imposed on the bit 11. Outward thrust is absorbed by the sliding contact of buttons 61 with buttons 25. Outward thrust is also absorbed by the sliding contact of the nose buttons 27 and 55. Air pumped down the drill pipe will discharge through nozzle 41 and also pass through passages 37, 35 and 33. The air will then flow laterally through channel 29 to flow through the bearings 65. The air flows through bearings 65 and through the recesses 45 in the thrust shoulder 23. Air also is discharged through passages 43 into the recesses 45 to flow through the balls 67 and bearings 63. The air will discharge at the backface 51 and the air exit slot 52.

The invention has significant advantages. Locating hard metal buttons in the opposed thrust shoulders increases the life of the thrust shoulders. Prolonging the life of the thrust shoulders prolongs the life of the bit by increasing the duration before wear finally allows the cutter to move back into locking and sliding contact with the head section.

While the invention has been shown in only one of its forms, it should be apparent to those skilled in the art that it is not so limited but is susceptible to various changes without departing from the scope of the invention.

I claim:

1. In an earth boring bit having a body with a depending bearing pin having a cylindrical outer section and a cylindrical inner section of lesser diameter, defining a bearing pin shoulder at the function of the inner and outer sections, the bit having a cutter with a cavity containing a cutter shoulder positioned opposite the bearing pin shoulder, the improvement comprising:

a plurality of cylindrical wear resistant buttons interferingly pressed in a circular array into holes formed in each of the shoulders, the buttons in the cutter shoulder having flat ends that slidingly engage flat ends of the buttons in the bearing pin shoulder, the buttons in one of the shoulders being formed of tool steel and being longer than the holes in which they are secured, causing them to protrude from the shoulder within which they are secured;

the buttons in the opposite shoulder being formed of tungsten carbide and having ends which are substantially flush with the shoulder in which they are secured.

2. In an earth boring bit having a body with a depending bearing pin having a cylindrical outer section and a cylindrical inner section of lesser diameter, defining a bearing pin shoulder at the junction of the inner and outer sections, the bit having a cutter with a cavity containing a cutter shoulder positioned opposite the bearing pin shoulder, the improvement comprising:

a plurality of cylindrical wear resistant buttons interferingly pressed in a circular array into holes formed in each of the shoulders, the buttons in the cutter shoulder having flat ends that slidingly engage flat ends of the buttons in the bearing pin shoulder, the buttons in one of the shoulders being longer than the holes in which they are secured, causing them to protrude from the shoulder within which they are secured;

the buttons which protude from the holes in which they are secured being formed of tool steel, and having an annular inlay of metal alloy on the ends; and the buttons in the opposite shoulder being formed of tungsten carbide.

* * * * *